United States Patent [19]

Braeger

[11] 4,203,179

[45] May 20, 1980

[54] MACHINE FOR SKINNING FISH OR FISH FILLETS

[75] Inventor: Horst K. H. Braeger, Lübeck, Fed. Rep. of Germany

[73] Assignee: Nordischer Maschinenbau Rud. Baader GmbH & Co KG, Lübeck, Fed. Rep. of Germany

[21] Appl. No.: 886,748

[22] Filed: Mar. 15, 1978

[51] Int. Cl.² ............................................. A22B 5/16
[52] U.S. Cl. ............................................ 17/62; 99/589
[58] Field of Search ....................... 17/50, 62; 99/589

[56] References Cited

U.S. PATENT DOCUMENTS

| 2,601,292 | 6/1952 | Hube | 17/62 |
| 3,892,010 | 7/1975 | Bartels et al. | 17/62 |
| 3,934,310 | 1/1976 | Bartels et al. | 17/62 |

Primary Examiner—Willie G. Abercrombie
Attorney, Agent, or Firm—Edward F. Levy

[57] ABSTRACT

A machine for skinning fish or fish fillets of different kinds, sizes and consistency comprising a skinning roller for conveying the fish, a skinning knife, a cutting edge on said skinning knife formed by two faces, one of which being provided to press the skin of fish or fish fillets against the skinning roller and the other one forming a back face, and a catching face arranged above the back face adjacent the cutting edge and arranged to be resiliently displaceable in the conveying direction of the fish or fish fillets, for ensuring the secure feeding of the skin between the skinning roller and the presser face.

14 Claims, 4 Drawing Figures

MACHINE FOR SKINNING FISH OR FISH FILLETS

BACKGROUND OF THE INVENTION

1. Field of Invention

The present invention relates to a machine for skinning fish or fish fillets, comprising a skinning roller, a skinning knife, a cutting edge on said skinning knife being formed by two faces of said skinning knife including an acute angle therebetween, one of said two faces being provided to press the skin of fish or fish fillets against said skinning roller while the other face forms a back face.

2. Description of Prior Art

Such skinning machines developed from known bacon slicers are noted for their simple construction and their quietness, and have been, therefore, in demand by people working in the fish processing industry. A fundamental obstacle to the possibility of being able to skin fish or fish fillets of different kinds of fish and of different fish sizes with skinning machines of this or similar structure lies in that a secure conveying of the skin between the presser face and the surface of the skinning roller is not achievable, and, therefore, several of the fish fillets run over the skinning knife unskinned. The application of these machines is therefore limited to the peeling off of the skin of whole soles.

It is known from British Patent No. 1 491 609 to use a knife, which has in the immediate vicinity of its cutting edge a projecting wall portion, which extends transversely to the conveying direction of the fillet portions and away from that side of the skinning knife turned towards the roller. Thus, a certain resistance is intended to be applied against the incoming fillet portion and the front part of the fillet portion to be forced against the cutting edge, whereby this operatively and securely should cut in between the external surface layer and the fillet portion. It remains to be seen, if and how far these goals are achieved; it has been shown that skinning machines fitted out with knives of this kind are not in the position to achieve a secure skinning of fish fillets of a broad variety of fish, because a quantity of these fillets run unskinned over the so-called "knife". Due to the non-availability of a cutting edge built by surfaces lying at an acute angle to each other, a skinning machine fitted with a "knife" of this kind is completely unsuitable for the skinning of fillets of plaice or similar flat fish. Further, in view of the undesired strain on tender fillets by the high projecting "knife", a skinning machine fitted with a knife of this type is also unsuitable for the skinning of small or soft fish fillets, because as a consequence of the lacking of a suitable cutting edge, these fillets are pulled by the roller, before completion of the skinning process, between the presser face and the surface of the roller, reduced to shreds by the teeth of the latter, and thereby are destroyed.

OBJECT OF INVENTION

To overcome these obstacles it is an essential object of the invention to develop a machine of the above mentioned structure to present the possibility of skinning fish or fish fillets of different kinds of fish and of different fish sizes all in one machine. It is another important object of the invention to achieve this at high yield and yet safe processing.

BRIEF SUMMARY OF THE INVENTION

According to the invention there is provided a machine for skinning fish or fish fillets, comprising a skinning roller, a skinning knife, a cutting edge on said skinning knife being formed by two faces of said skinning knife including an acute angle therebetween, one of said two faces being provided to press the skin of fish or fish fillets against said skinning roller while the other face forms a back face and a catching face formed on catching face carrying means arranged above said back face adjacent said cutting edge and resiliently displaceable substantially in the conveying direction of fish or fish fillets.

The main advantages achieved by this machine constructed according to the invention are that this machine is adapted to skin fillets of fish of different kinds, sizes and consistency in an effective manner and without waste of the fish meat, and at the same time to ensure the secure feeding of the skin—without regard to its thickness—between the surface of the skinning roller and the presser face whereby the cutting edge of the knife will safely sever the tendons and ligaments linking the skin and the meat, as well as to ensure the obtaining of skinned fish fillets without delay and waste.

Advantageously, the width of the catching face is between 2 and 6 millimeters. This on the one hand, ensures the alignment of the preceding portion of the fish fillets, and on the other hand, avoids strain on the fillets sliding away over the catching face.

The machine may comprise a slide element supporting the catching face carrying means and being displaceable substantially parallel to the back face. This is of particular advantage in the case of a displaceable skinning knife. Alternatively, the machine may comprise a pivot element supporting the catching face carrying means and being pivotable about a pivot axis, which lies either below or above the other face of the skinning knife. The first of these embodiments makes possible a pivoting for the purpose of cleaning, while the second facilitates the adaptation or reconstruction of already existing skinning machines to achieve the objects of the present invention with those, too.

The machine may comprise means for displaceably guiding the slide element and being supported on the skinning knife, or a holder carrying the pivot element and arranged to be pivotable about the pivot axis. This, on the one hand, facilitates a precise positioning of the catching face with respect to the cutting edge of the skinning knife while on the other hand, a pre-mounting of the skinning knife together with the carrying element of the catching face becomes possible.

The holder, particularly the pivot axes, may be so arranged as to cause movement of the pivot element substantially tangentially to the plane of the back face adjacent the cutting edge. By this arrangement the catching face lets itself be arranged slit-free over the skinning knife, whereby the secure feeding of fillets with very thin skin be attained.

The angle included between the catching face and the back face of the skinning knife may be between substantially 60° and 120°. Thus, any desired adjustment of the position of the catching face to the skinning knife may be possible with different acute angles between the presser face and the back face.

The minimum deflection, in the conveying direction of fish or fish fillets, of the catching face away from the cutting edge of the skinning knife may be 0.5 millimeters, whereby the skinning knife can fulfil undisturbed its double aim as a slitting and cutting element.

The catching face may be convexly structured, which structure can cause the incoming fillet ends to open out and thereby to be securely fed in.

The catching face carrying means may comprise a plurality of catching face carrying elements arranged in the longitudinal direction of the skinning knife, each of the catching face carrying elements being displaceable independently of the other or others of the catching face carrying elements. This enables a plurality of fish fillets to be skinned simultaneously, wherein the conveying of these can take place in a squamiform scale-like or partially overlapping manner and in an adjacent relationship with respect to each other.

There may be provided presser roller means yieldingly arranged adjacent to and above the guide surface carrying means, and drive means to rotate the roller means in a direction opposite to the rotational direction of the skinning roller and at a speed at least equal to the speed of the skinning roller. The presser roller means may comprise a plurality of roller elements arranged in the longitudinal direction of the presser roller means. By such structures the feeding of both fresh and rigid fish fillets can be securely controlled.

BRIEF DESCRIPTION OF THE DRAWINGS

Other and further objects of the present invention will be apparent from the following description and claims and are illustrated in the accompanying drawings, which by way of illustration show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the schematic drawings.

DETAILED DESCRIPTION OF THE PREFERRED EMBODIMENTS

Figure 1:
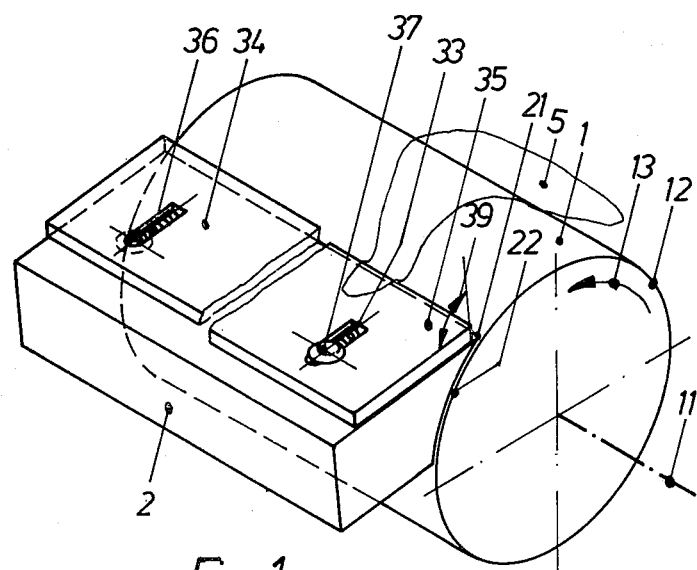
FIG. 1 is an isometric view of a skinning machine embodying the invention.

Referring now to the drawings, FIG. 1 shows a skinning machine having a skinning roller 1 pivoted on a not shown shaft rotatable about a horizontal rotating axis 11 in the rotating direction 13 by not shown means known in the art. The skinning roller 1 has in the cylindrically extending direction indentations of known kind but not shown and interrupting the surface 12 of the skinning roller 1. A presser face 22 of a skinning knife 2 is arranged a very small distance from this surface 12. A back face 23 of the skinning knife 2 makes an acute angle 24 with the presser face 22, the top of this angle 24 being structured as a cutting edge 21. Not shown in FIG. 1 are means arranged before or above the upper half of the skinning roller 1 for the conveying or feeding of fish fillets 5, these means being in the form of a loading slide or of an endless conveyor belt. Also not shown are means for the delivery of the skinned fish fillets arranged in the form of a fillet-delivery conveyor belt. A slide element 34 is arranged in close relation to the skinning knife 2, and is slidably displaceable with respect to the back face 23 of the skinning knife 2. The slide element 34 has two guide slits 33, which are penetrated by respective guide elements 37. These guide elements 37 are, by way of example, fastened to the skinning knife 2 by means of bolts, and prevent by means of their heads the yielding of the slide element 34 upwards and simultaneously limit the displacement of the slide element 34 by their abutting position at the end of the guide slits 33. By means of compression springs 36 arranged in the guide slits 33 the slide element 34 is held in a position in which a guide surface 3, which may also be described as a catching face provided along the axial edge of the slide element 34, is located over the cutting edge 21. The left half of the slide element 34 is shown in this position whilst the right half of which—designated as slide element 35—is located in a displaced position in an advancing direction of the fish fillets 5.

Figure 2:
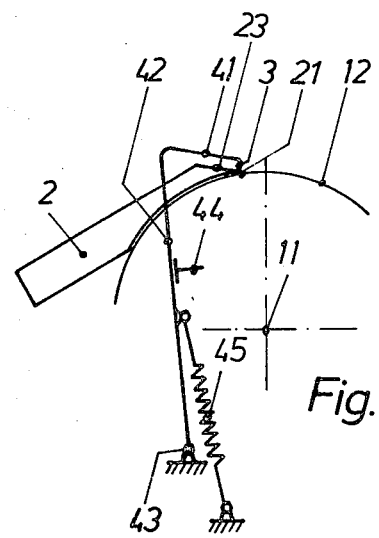
FIG. 2 is a partial side view of another skinning machine embodying the invention.

FIG. 2 shows a skinning roller 1 with a surface 12 and a rotational axis 11. A skinning knife 2, which has a back face 23, is associated with the surface 12. A holder 42 is pivotably located round a fixed pivot 43 and held against an abutment 44 by a tension spring 45. The holder 42 carries on its upper end a pivot element 41, which at its right hand end is formed with the catching face 3 facing downwardly. This is located over the cutting edge 21 of the skinning knife 2.

Figure 3:
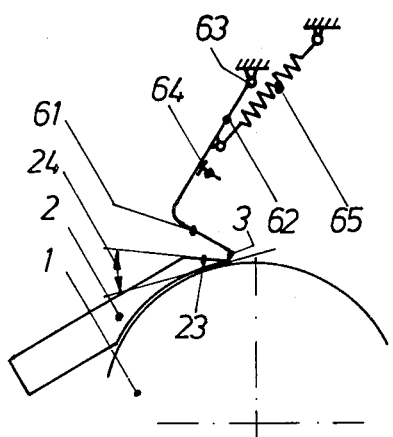
FIG. 3 is a partial side view of yet another skinning machine embodying the invention.

FIG. 3 shows a skinning roller 1, a skinning knife 2, and a holder 62 pivotable about a pivot axis 63 lying a considerable distance above the back face 23 of the knife. The holder 62 is held against a stop 64 by a tension spring 65. This holder carries at its lower end a pivot element 61, which points towards the cutting edge 2, i.e. to the right and at its right end is provided with a catching face 3, which is disposed above the cutting edge 21 of the skinning knife 2 and reaches up to closely above the back face 23.

Figure 4:
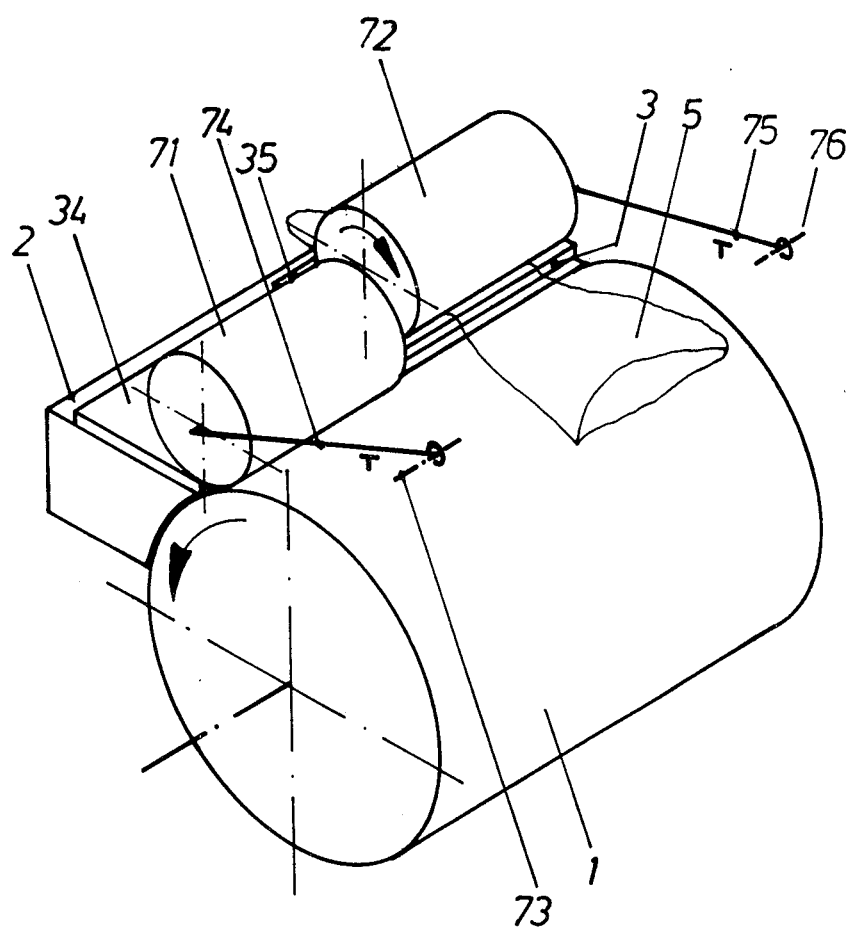
FIG. 4 is an isometric view of the skinning machine of FIG. 1 showing a pair of presser rollers mounted thereon.

FIG. 4 shows a skinning machine similar to that of FIG. 1, but with, for example, two presser rollers 71 and 72 arranged above the skinning roller 1 and above the slide elements 34 and 35, one of the presser rollers 72 being shown in a displaced position caused by the fillet 5. The presser rollers 71 and 72 are mounted to journal on the free ends of respective pivot arms 74 and 75 which are pivotable about respective pivot axes 73 and 76 mounted on the frame of the skinning machine. The presser rollers 71 and 72 are driven by any suitable drive means in a direction opposite to the direction of rotation of the skinning roller 1, and at least at the same pheripheral speed as the latter.

In use, a fish fillet 5 is fed with its skin side down and its tail end forward to the roller 1, e.g. by a conveyor belt and from the skinning roller 1 is advanced in the direction of the skinning knife 2. When the preceding portion of the fish fillet 5 reaches the cutting edge 21 of the skinning knife 2, the catching face 3 is displaced by the latter, so that the cutting edge 21 can press in between the leather skin and the flesh portion of the fish fillet 5. The advancement of the fish fillet continues by positive engagement of the skin with the surface 12 of the skinning roller 1 under the pressure applied by the presser face 22. The displacement of the catching face 3 on starting to cut the fish fillet amounting to about 0.5 millimeters, is then increased with the progress of the skinning process to, for example, 3 millimeters, whilst the skinned fillet slides away over the guide surface 3. After the passage of the fillet 5, the catching face 3 returns to its initial position by the operation of the springs 36 or 45 respectively.

What we claim is:

1. A machine for skinning fish or fish fillets, comprising a skinning knife, a driven skinning roller having a circumferential surface adapted to support said fish or fish fillets and carry the same in a feeding path to said skinning knife, said skinning knife having a cutting edge formed by a presser face extending downstream from said cutting edge and forming with said circumferential surface of said skinning roller a narrow space for receiving the fish skin and for coacting with said circumferential surface to effect a skin gripping and pulling action, and by a back face disposed at an acute angle to said presser face, and a catching face formed on catching face carrying means arranged above said back face adjacent said cutting edge and resiliently displaceable substantially in the direction of travel of said fish or fish fillets, said catching face carrying means including biasing means urging said catching face in a direction opposite to the direction of travel of said fish to a position in which it overlies and covers over said cutting edge of said skinning knife with said catching face being positioned in said feeding path to be initially engaged by said fish or fish fillet as the latter approaches said skinning knife, and being adapted to block the leading end of the fish or fish fillet and force the skin thereof beneath said cutting edge and into said space between the knife presser face and the skinning roller surface, said catching face being then movable in the opposite direction against the face of said biasing means to a position in which it uncovers and exposes said cutting edge.

2. A machine as claimed in claim 1, wherein the width of said catching face is between 2 and 6 millimeters.

3. A machine as claimed in claim 1, comprising a slide element supporting said catching face carrying means and being displaceable substantially parallel to said back face.

4. A machine as claimed in claim 3, comprising means for displaceably guiding said slide element and being supported on said skinning knife.

5. A machine as claimed in claim 1, comprising a pivot element supporting said catching face carrying means and being pivotable about a pivot axis, which lies above said back face.

6. A machine as claimed in claim 1, comprising a pivot element supporting said catching face carrying means and being pivotable about a pivot axis, which lies below said back face.

7. A machine as claimed in either claim 5 or claim 6, comprising holder means carrying said pivot element and arranged to be pivotable about said pivot axis.

8. A machine as claimed in claim 7, wherein said holder means is so arranged as to cause movement of said pivot element substantially tangentially to the plane of said back face adjacent said cutting edge.

9. A machine as claimed in claim 1, wherein the angle included between said guide surface and said back face is between substantially 60° and 120°.

10. A machine as claimed in claim 1, wherein the minimum deflection, in the conveying direction of fish or fish fillets, of said catching face away from said cutting edge is 0.5 millimeters.

11. A machine as claimed in claim 1, comprising a pivot element supporting said catching face carrying means and being pivotable about a pivot axis which lies outside the plane of said back face.

12. A machine as claimed in claim 1 wherein said catching face carrying means comprises a plurality of catching face carrying elements arranged in the longitudinal direction of said skinning knife, each of said catching face carrying elements being displaceable independently of the other or others of said catching face carrying elements.

13. A machine as claimed in claim 1, comprising presser roller means yieldingly arranged adjacent to and above said catching face carrying means, said roller means being driven in a direction opposite to the rotational direction of said skinning roller and at a speed at least equal to the speed of said skinning roller.

14. A machine as claimed in claim 13 wherein said presser roller means comprises a plurality of roller elements arranged in the longitudinal direction of said presser roller means.

* * * * *